(12) United States Patent
Shinkai et al.

(10) Patent No.: US 10,900,787 B2
(45) Date of Patent: Jan. 26, 2021

(54) FIELD TRAVELING ROUTE PRODUCTION SYSTEM AND FIELD WORK VEHICLE

(71) Applicant: KUBOTA CORPORATION, Osaka (JP)

(72) Inventors: Atsushi Shinkai, Sakai (JP); Kotaro Yamaguchi, Amagasaki (JP)

(73) Assignee: KUBOTA CORPORATION, Osaka (JP)

( * ) Notice: Subject to any disclaimer, the term of this patent is extended or adjusted under 35 U.S.C. 154(b) by 109 days.

(21) Appl. No.: 16/099,021

(22) PCT Filed: Dec. 8, 2016

(86) PCT No.: PCT/JP2016/086597
§ 371 (c)(1),
(2) Date: Nov. 5, 2018

(87) PCT Pub. No.: WO2017/216983
PCT Pub. Date: Dec. 21, 2017

(65) Prior Publication Data
US 2019/0186922 A1 Jun. 20, 2019

(30) Foreign Application Priority Data

Jun. 17, 2016 (JP) .................................. 2016-120810

(51) Int. Cl.
*G01C 21/20* (2006.01)
*A01B 69/00* (2006.01)
(Continued)

(52) U.S. Cl.
CPC .............. *G01C 21/20* (2013.01); *A01B 69/00* (2013.01); *B62D 6/00* (2013.01); *G05D 1/02* (2013.01)

(58) Field of Classification Search
CPC ........... B62D 6/00; A01B 69/00; A01B 69/04; A01B 69/002; A01B 69/001;
(Continued)

(56) References Cited

U.S. PATENT DOCUMENTS 8,060,269 B2 * 11/2011 Dix ...................... A01B 69/008
56/10.2 R
2017/0168501 A1 6/2017 Ogura et al.
2019/0101931 A1 4/2019 Ogura et al.

FOREIGN PATENT DOCUMENTS

JP 10-243708 A 9/1998
JP 2004-8053 A 1/2004
(Continued)

OTHER PUBLICATIONS

English translation of JP-2015-112071-A, published Jun. 22, 2015.
(Continued)

*Primary Examiner* — Anthony R Jimenez
(74) *Attorney, Agent, or Firm* — Birch, Stewart, Kolasch & Birch, LLP

(57) ABSTRACT

A field traveling route production system includes: a field information storage section that stores field information including position information each of a field and an entrance/exit area of the field; a work traveling route calculation section (61) that calculates a work traveling route for the field work vehicle based on the field information and specification of the field work vehicle, the work traveling route interconnecting a traveling work starting point and a traveling work ending point; a fore traveling route calculation section (62) that calculates a fore traveling route extending from the entrance/exit area to the traveling work starting point of the work traveling route; and a post traveling route calculation section (63) that calculates a post traveling route extending from the traveling work ending point to the entrance/exit area.

14 Claims, 5 Drawing Sheets

(51) Int. Cl.
*B62D 6/00* (2006.01)
*G05D 1/02* (2020.01)

(58) Field of Classification Search
CPC ... A01B 69/003; A01B 69/004; A01B 69/005; A01B 69/006; B60W 2050/0014; B60W 2050/0013; B60W 2050/0019; B60W 2050/0026; B60W 2050/0028; B60W 2050/0027; B60W 2050/0031; B60W 2050/004; B60W 40/00; G05D 3/00; G05D 13/00; G05D 2201/00; G05D 2201/02; G05D 2201/0201; G05D 2201/0208; G05D 2201/021; G05D 1/00; G05D 1/02; G05D 1/0219; G05D 1/0221; G05D 1/0223; G05D 1/0225; G05D 1/0227; G05D 1/0246; G05D 1/0268; G05D 1/027; G05D 1/0274; G05D 1/0276; G05D 1/0278; G05D 1/0011; G05D 1/0033; G05D 1/0038; G05D 1/0044; G01C 21/00; G01C 21/04; G01C 21/10; G01C 21/14; G01C 21/16; G01C 21/20; G01C 21/34; G01C 21/36; G01C 21/3626

USPC .................................. 701/23, 25, 50, 521
See application file for complete search history.

(56) References Cited

FOREIGN PATENT DOCUMENTS

| | | |
|---|---|---|
| JP | 2004-354117 A | 12/2004 |
| JP | 2005-176741 A | 7/2005 |
| JP | 2011-254704 A | 12/2011 |
| JP | 2015-112071 A | 8/2015 |
| WO | WO 2015/118730 A1 | 8/2015 |

OTHER PUBLICATIONS

European Search Report of Application No. 16905536.5 dated Dec. 17, 2019.

\* cited by examiner

FIELD TRAVELING ROUTE PRODUCTION SYSTEM AND FIELD WORK VEHICLE

TECHNICAL FIELD

The present invention relates to a field traveling route production system for producing a traveling route for manual traveling or autonomous traveling of a field work vehicle. The invention relates also to a field work vehicle configured to travel along a traveling route produced by the field traveling route production system.

BACKGROUND ART

A field work vehicle according to Patent Literature 1 includes a route calculation section for calculating a traveling route for a traveling vehicle body suitable for an agricultural work, based on topographical data of a field read out from a field information storage section as basic conditions. This route calculation section obtains the contour of the field from the topographical data, and calculates a traveling route which starts from a preset traveling starting position to a traveling ending point. In this, in the field, a location for entering/exiting the field from its ridge or farm road is often predetermined. Thus, in Patent Literature 1, it is proposed that the traveling starting point should be set by the entrance position of the field and the traveling ending point should be set by the exit position of the field. Upon calculation of the traveling route by the route calculation section, a self vehicle position is acquired based on positioning data (latitude/longitude data) obtained from a global positioning system module (GPS module), and a driving assistance unit will assist driving of this field work vehicle such that its traveling vehicle body may travel precisely on the traveling route calculated by the route calculation section.

PRIOR ART DOCUMENT

Patent Literature

Patent Literature 1: Japanese Unexamined Patent Application Publication No. 2015-112071 (JP 2015-112071 A)

SUMMARY OF THE INVENTION

Object to be Achieved by the Invention

In general, entrance/exit for allowing a field work vehicle to enter/exit a field is predetermined for each field. Also, in case the field is a paddy field or the like, the field is located lower than a road around it and the traveling surface of the entrance/exit is inclined. The position and/or the shape of the entrance/exit area including such entrance/exit will impose a limitation in the entering direction for the field work vehicle to the field and the exiting direction for the same from the field. Therefore, if the traveling starting point and the traveling ending point used as the base points at the time of calculation of the traveling route in the field are set without taking the position and/or the shape of the entrance/exit area into consideration, there will occur wasteful traveling in the traveling from the entrance/exit to the traveling starting point and the traveling from the traveling ending point to the entrance/exit; and in some cases, there will occur difficulty in such traveling. The route calculation section disclosed in Patent Literature 1 takes the position of the entrance/exit into consideration in its calculation of the traveling route by using a field entrance position as the traveling starting point and a field exit position as the traveling ending point. However, this calculation method simply uses a field entrance position as the traveling starting point and a field exit position as the traveling ending point, and the method does not take into consideration favorable passage through the entrance/exit for allowing smooth connection with the traveling route within the field. Therefore, with the above-described calculation method of traveling route, it is difficult to calculate an appropriate route which will guide efficient traveling work.

In view of the above-described state of the art, there is a need for a field traveling route production system capable of producing a work traveling route for obtaining efficient traveling work, and producing also a traveling route which allows smooth traveling at the entrance/exit area, and a starting point and an ending point of the work traveling route.

Solution to Achieve the Object

The present invention provides a field traveling route production system configured to produce a traveling route for a field work vehicle, the system comprising:

a field information storage section that stores field information including position information of a field and position information of an entrance/exit area of the field;

a work traveling route calculation section that calculates a work traveling route for the field work vehicle based on the field information and specification of the field work vehicle, the work traveling route interconnecting a traveling work starting point and a traveling work ending point;

a fore traveling route calculation section that calculates a fore traveling route extending from the entrance/exit area to the traveling work starting point of the work traveling route; and a post traveling route calculation section that calculates a post traveling route extending from the traveling work ending point to the entrance/exit area.

With the above-described arrangement, three (3) traveling routes, namely, a fore traveling route for guiding the field work vehicle from the entrance/exit area to the traveling work starting point of the work traveling route, a post traveling route for guiding the field work vehicle from the traveling work ending point to the entrance/exit area, and a work traveling route for guiding the field work vehicle from the traveling work starting point to the traveling work ending point are calculated individually by a fore traveling route calculation section, a post traveling route calculation section and a work traveling route calculation section, respectively. Therefore, it is also possible to set smooth passage through the entrance/exit area as priority condition in the calculation of the whole traveling route. For instance, an appropriate fore traveling route can be calculated by obtaining an optimal solution from traveling work starting point candidate group appropriate for starting a traveling work within a field, and traveling route candidate group that allows smooth passage through the entrance/exit area toward the traveling work starting point from the field entering direction. Also, an appropriate post traveling route can be calculated by obtaining an optimal solution from ending point (traveling work ending point) candidate group of traveling route of a traveling work which covers the entire field starting from the traveling work starting point, and traveling route candidate group that allows smooth passage through the entrance/exit area from the traveling work ending point toward a field exiting direction. For the calculation of the work traveling route from the traveling work starting point to the work traveling ending point, the conventional calculation algorithm can be employed. With this, at whatever position of the entrance/exit may be located relative to the field, the vehicle may smoothly travel through the entrance/exit area to enter the field, carry out a traveling work and then travel through the entrance/exit again to exit the field smoothly. Incidentally, in case the entrance/exit area includes an area outside the field (a farm road, etc.), the fore traveling route and the post traveling route will include such area outside the field also. And, such fore traveling route can smoothly guide the field vehicle from outside the field to the traveling work starting point, and such post traveling route can smoothly guide the field work vehicle from the traveling work ending point to the area outside the field. Needless to say, it is also possible to exclude such area outside the field in the entrance/exit area, thus causing this entrance/exit area to include only area inside the field and configuring the fore traveling route and the post traveling route as routes inside the field. Further alternatively, it is also possible to configure only one of the fore traveling route and the post traveling route as a route including an area outside the field.

In case a field is a paddy field or the like, such field is disposed lower than a road around it. Therefore, if level difference of traveling surface is taken into consideration for the passage through the entrance/exit area, even more smooth passage will be made possible. For this reason, according to one preferred embodiment of the present invention, the field information includes traveling surface slope information of the entrance/exit area; and the traveling surface slope information is taken into consideration when the fore traveling route and the post traveling route are calculated. For instance, if the traveling surface slope is steep, a sharp turn after descending this sloped surface will be difficult. Also, ascending such steep sloped surface immediately after a sharp turn will be also difficult. Therefore, it will be advantageous to make a change in a turning radius or the like which is to be applied in accordance with the traveling surface slope.

Moreover, depending on the specification of the field work vehicle, traveling on a steep sloped surface at the entrance/exit area should preferably be either forward traveling or reverse traveling. And, in order to avoid contact with a ridge or the like, it is sometimes necessary to elevate a liftable implement to its maximal elevated position. Thus, for smooth passage through the entrance/exit area, both the traveling surface slope information and the specification of the field work vehicle will be needed. Then, according to one preferred embodiment of the present invention, based on the traveling surface slope information and the specification of the field work vehicle, a posture and/or an orientation of the field work vehicle are/is determined for the fore traveling route and the post traveling route.

Advantageously, a supervising person or a driver should be allowed to confirm the calculated traveling route. For this reason, according to one preferred embodiment of the present invention, the field traveling route production system further comprises an informing section having a display data generation function for displaying the work traveling route, the fore traveling route and the post traveling route on a display.

The present invention relates also to a field work vehicle configured to carry out a traveling work along a traveling route generated by the above-described field traveling route production system. If such field work vehicle comprises a display for displaying the work traveling route, the fore traveling route and the post traveling route, it advantageously allows a driver or a supervising person to confirm the traveling route. Further, since such field work vehicle has the function of producing the work traveling route, the fore traveling route and the post traveling route, automatization of the traveling work will be realized if the work vehicle comprises an autonomous traveling control section configured for autonomous traveling on the the work traveling route, the fore traveling route and the post traveling route thus produced. Further, the present invention relates also to a field work vehicle having the above-described field traveling route production system incorporated in a control system.

EMBODIMENTS OF THE INVENTION

Figure 1:
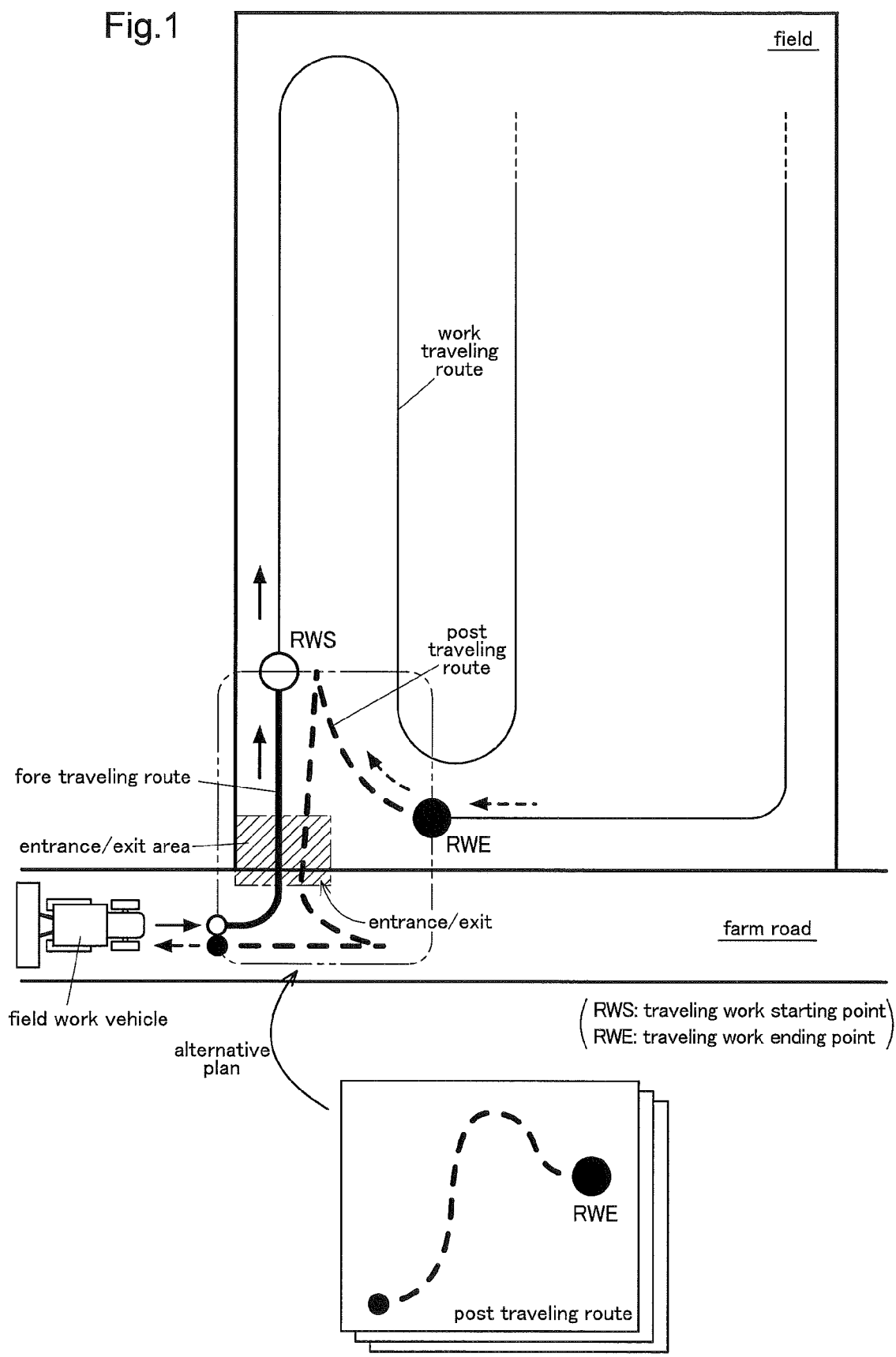
FIG. 1 is a schematic diagram showing basic examples of a field entrance/exit and traveling routes produced by a field traveling route production system.

Before describing a specific example of a field traveling route production system according to the present invention, its basic principle will be described with reference to FIG. 1 and FIG. 2. In FIG. 1, there is shown a field as a subject of a traveling work, adjacent a farm road on which a field work vehicle can travel. In this field, there is formed an entrance/exit for allowing the field work vehicle to enter/exit the field from/to the farm road. As the surface of the field is located lower than the farm road, the entrance/exit has a sloped surface for compensating for this level difference. An "entrance/exit area" is set as an area necessary for the field work vehicle to enter the field through the entrance/exit and an area necessary for the field work vehicle to return from the inside of the field to the farm road through the entrance/exit.

When the field work vehicle travels on the sloped surface of the entrance/exit to reach a traveling work starting point (shown as RWS in the figure), a traveling work will be started from this point. This traveling work starting point is defined as a location that allows the field work vehicle to be moved from the entrance/exit area including the sloped surface of the entrance/exit, to a condition/area for starting the traveling work within the field appropriately. Next, when the field work vehicle has carried out the traveling work within the field and arrived at a traveling work ending point (shown as RWE in the figure), the traveling work will be ended. This traveling work ending position is defined as a location that allows the field work vehicle to enter a traveling route that extends to the entrance/exit area including the sloped surface of the entrance/exit.

Figure 2:
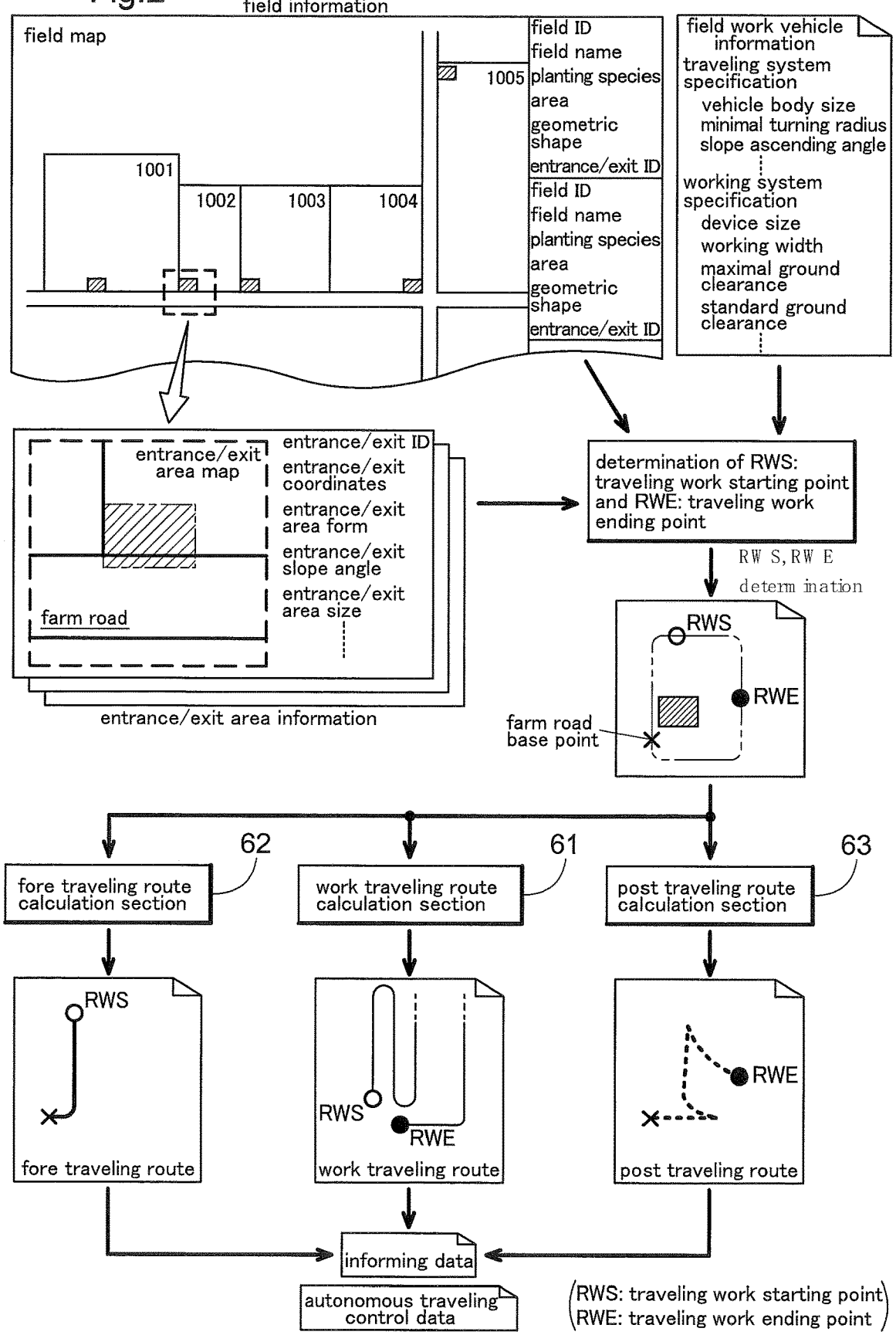
FIG. 2 is a schematic diagram showing basic data flow in traveling route production by the field traveling route production system.

Here, the traveling route of the field work vehicle extending from the entrance/exit area to the traveling work starting point is referred to as "fore traveling route", which is shown in a bold solid line in FIG. 1 and FIG. 2. Also, the traveling route of the field work vehicle extending from the traveling work ending point to the entrance/exit area is referred to as "post traveling route", which is shown in a bold dotted line in FIG. 1 and FIG. 2. Incidentally, in the example shown in FIG. 1 and FIG. 2, since the entrance/exit area includes an area outside the field (farm road, etc.), the fore traveling route will guide the field work vehicle from the outside of the field to the traveling work starting point; and the post traveling route will guide the field work vehicle from the traveling work ending point to the outside of the field. Needless to say, the entrance/exit area can exclude such area outside the field, and consist of only the area inside the field, or one of the fore traveling route and the post traveling route may include the route outside the field. In the embodiment as shown in FIG. 1 and FIG. 2, the field work vehicle will travel along the fore traveling route from the farm road to pass through the sloped surface of the entrance/exit area to enter the field to reach the traveling work starting point. Also, the field work vehicle will travel along the post traveling route from the traveling work ending point to pass through the sloped surface of the entrance/exit area to exit the field to return to the farm road. The traveling route from the traveling work starting point to the traveling work ending point where the vehicle carries out the traveling work actually is referred to as "work traveling route". This work traveling route, in general, comprises a route in which the vehicle effects straight traveling and turning traveling (180 degree turn or 90 degree turn) in repetition. Though not described here in details as its route calculation algorithm is well-known in the art, this traveling route will be configured as a route to travel all over the field with working widths being slightly overlapped in the case of a cultivator tractor or a combine.

The shapes of the fore traveling route and the post traveling route will be affected by the location and the shape/form of the entrance/exit area relative to the farm road or the field. Here, important factors that define or specify the form (situation) of the entrance/exit area include e.g. an angle, a level difference, a length and a width of the entrance/exit area sloped surface; and a width and a length of the entrance/exit area. Position information of the entrance/exit area describing data relating to such position and form of the entrance/exit area are included in "field information" together with the position information of the field.

Next, with reference to FIG. 2, there will be described a basic flow of data for production of traveling routes of a field work vehicle in a particular field. Upon determination of a field where a traveling work is to be carried out, field information of the field as subject of traveling work will be extracted from a database storing field information. Such field information includes e.g. a field map, a field name, a planting species, a field area, a field geometrical shape, etc. Further, the field map includes an entrance/exit area; and entrance/exit area information is linked thereto as field property information. The entrance/exit area information includes e.g. an entrance/exit coordinates, an entrance/exit area shape, an entrance/exit slope angle, an entrance/exit area size, etc. Then, a traveling work starting point and a traveling work ending point will be determined, based on data relating to the field shape included in the field information, entrance/exit area shape data and traveling surface slope data included in the entrance/exit area information (a level difference and a slope angle of the entrance/exit area, etc.), traveling system specification data of this field work vehicle (a vehicle body size, a minimal turning radius, an allowable slope ascending angle, etc.) and working system specification data (a working width, and a maximal elevated position and a normal position of a utility implement, etc.).

A fore traveling route calculation section 62 calculates the fore traveling route extending from a farm road base point, which acts as a point for entrance from the farm road to the field, to the traveling work starting point, based on the entrance/exit area information, and on traveling system specification and working system specification of the field work vehicle. A post traveling route calculation section 63 calculates the post traveling route extending from the traveling work ending point and out of the field to return to the farm road traveling, based on the entrance/exit area information, and on the traveling system specification and the working system specification of the field work vehicle. Normally, the fore traveling route will include a downslope surface, whereas the post traveling route will include an upslope surface. Further, the post traveling route is a traveling route after completion of traveling work, the vehicle will be often prohibited from re-entering the area after completion of the traveling work, so that the post traveling route will be subjected to more/stricter restrictions than the fore traveling route. For this reason, the post traveling route may sometimes incorporate a reverse traveling in order to shorten the path length. Needless to say, such reverse traveling may be incorporated in the fore traveling route. And, a direct/actual work traveling route calculation section 61 calculates a work traveling route which is a combination of straight traveling paths and turning traveling paths, and which starts from the traveling work starting point to the traveling work ending point, based on the field map and the traveling system specification, and on the working system specification of the field work vehicle.

Each of the traveling routes calculated by the work traveling route calculation section 61, the fore traveling route calculation section 62 and the post traveling route calculation section 63 can be a plurality of traveling routes, instead of one, so that the driver or the supervising person can select one of them.

The fore traveling route, the work traveling route and the post traveling route calculated as above will be formed into display data in individual or integrated format(s) and shown on a display, for allowing confirmation by the driver or the supervising person. After completion of this confirming, the field work vehicle will travel along the respective traveling route autonomously or manually. In the case of manual traveling, if the vehicle includes a self vehicle position detection function, driving assistance will be provided such that positional deviation/difference between the detected self vehicle position and each traveling route will be informed. Alternatively, the autonomous traveling and manual traveling may be provided in a mixed state.

Figure 3:
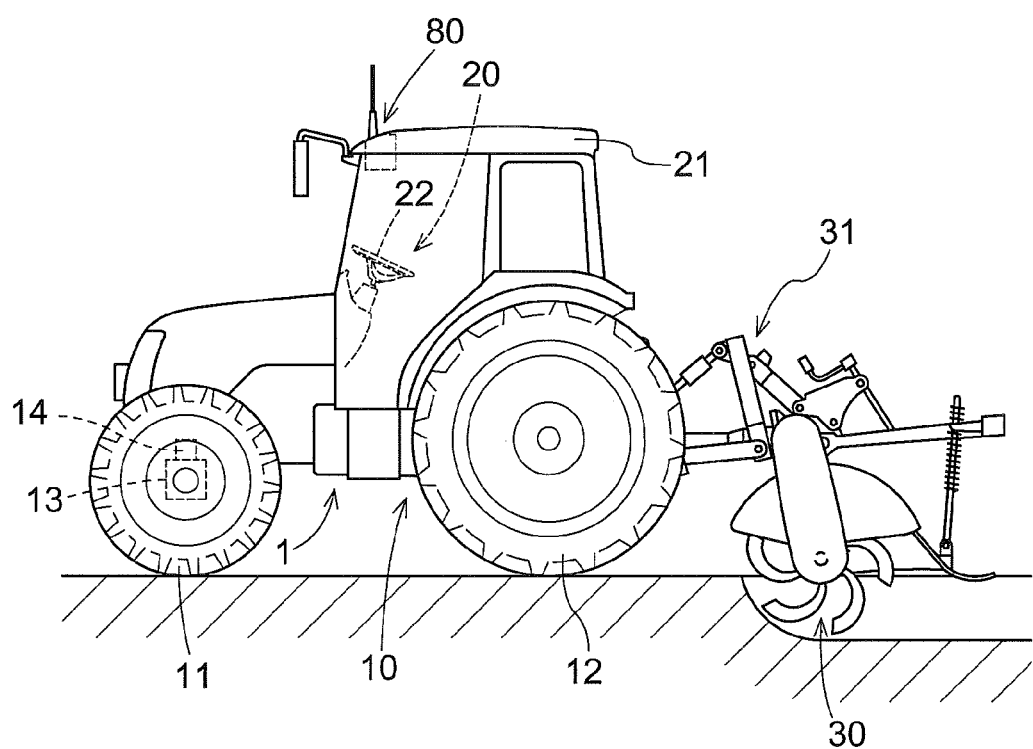
FIG. 3 is a side view of a tractor having a cultivator device, showing one specific example of a field work vehicle.

Next, one specific embodiment of the field work vehicle according to the present invention will be described. As shown in FIG. 3, the field work vehicle in the illustrated embodiment is configured as a tractor which mounts a utility implement 30 for carrying out an agricultural work (e.g. a rotary cultivator for carrying out an agricultural work such as a cultivation work, etc.) on a field (a work field) delimited by a ridge. In this tractor, at a center portion of a vehicle body 1 supported by front wheels 11 and rear wheels 12, a maneuvering section 20 is provided. At a rear portion of the vehicle body 1, the implement 30 which is a rotary cultivator is mounted via a hydraulic lift mechanism 31. The front wheels 11 function as steering wheels, so that a traveling direction of the tractor is changed by changing their steering angle. The steering angle of the front wheels 11 is changed by an operation on a steering mechanism 13. This steering mechanism 13 includes a steering motor 14 for autonomous steering. At time of manual traveling, the steering of the front wheels 11 is made possible by an operation on a steering wheel 22 disposed at the maneuvering section 20. In a cabin 21 of the tractor, there is provided a global positioning system module (GPS module) 80 constituted as a global navigation satellite system module (GNSS module). A GPS antenna for receiving GPS signals or GNSS signals is mounted on a ceiling area of the cabin 21. Incidentally, the GPS module 80 can include an inertial navigation module incorporating a gyro acceleration sensor, a geomagnetic direction sensor, etc. in order to assist/supplement the GPS navigation. Needless to say, the inertial navigation module can be provided at a site different from the GPS module 80.

Figure 4:
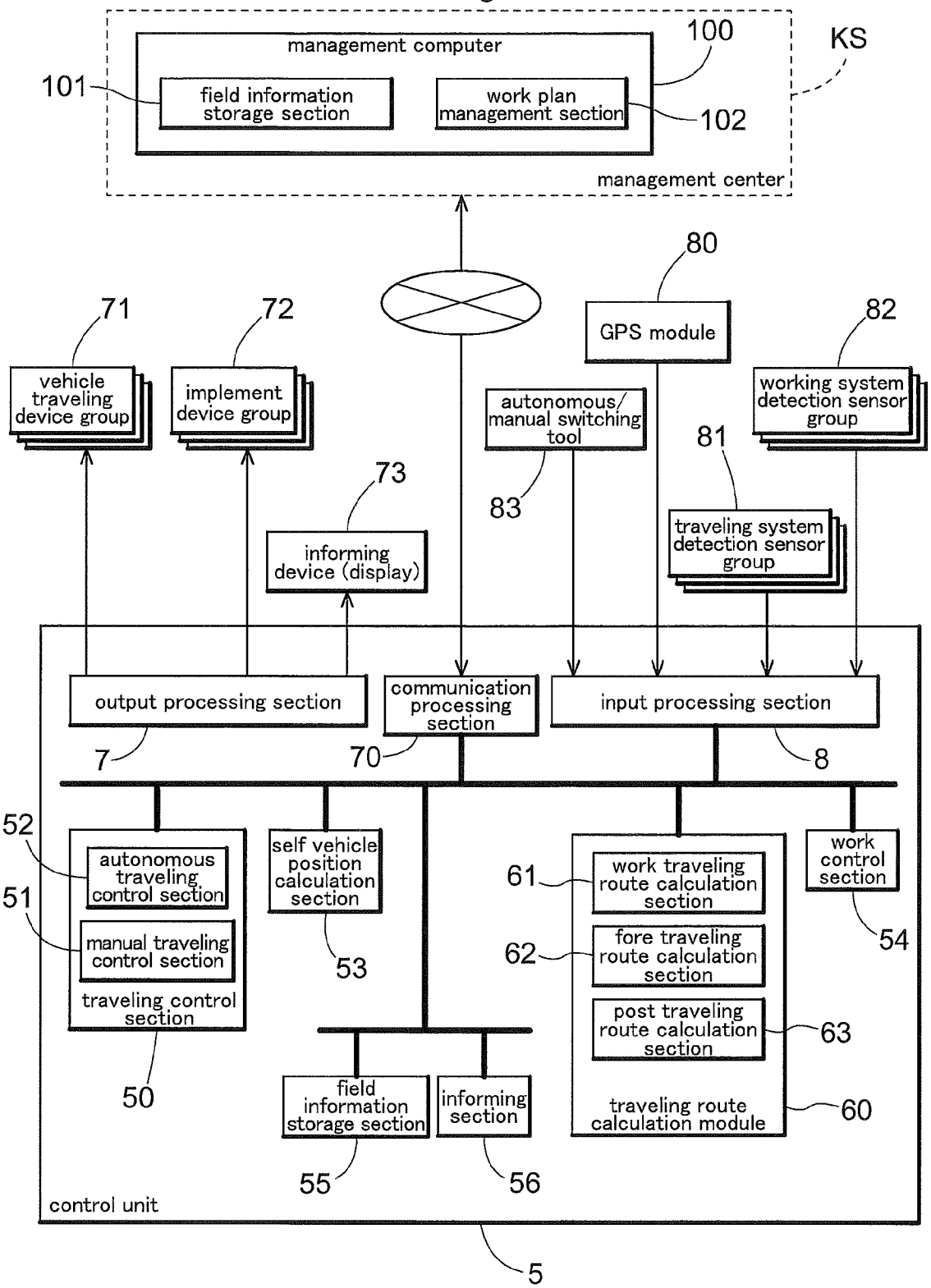
FIG. 4 is a functional block diagram showing a control system of the tractor.

FIG. 4 shows a control system built in this tractor. This control system is configured to be able to utilize the basic principle of the inventive field traveling route production system described above with reference to FIG. 1 and FIG. 2. A control unit 5 which is the core component of this control system includes an output processing section 7, an input processing section 8 and a communication processing section 70, which function as an input/output interface. The output processing section 7 is connected to a vehicle traveling device group 71, an implement device group 72, an informing device 73, etc. Though not shown in the figure, the vehicle traveling device group 71 includes the steering motor 14 and devices controlled for vehicle traveling such as a speed changer mechanism, an engine unit, etc. The implement device group 72 includes a driving mechanism for the implement 30, a lift mechanism 31 for lifting up/down the implement, etc. The communication processing section 70 has function of transmitting data processed at the control unit 5 to a management computer 100 built in a remote management center KS and receiving various data from the management computer 100. The informing device 73 includes a display, a lamp and a speaker. In particular, each traveling route produced by the control unit is shown on the display. The lamp and the speaker are used for informing the driver or the operator of various kinds of information desired to be informed to the driver, such as items of caution in traveling, a degree of deviation from a target traveling route in the autonomous steering traveling. Signal transmission between the informing device 73 and the output processing section 7 is effected in either wired or wireless manner.

The input processing section 8 is connected to the GPS module 80, a traveling system detection sensor group 81, a working system detection sensor group 82, an autonomous/manual switching operation tool 83, etc. The traveling system detection sensor group 81 includes sensors for detecting traveling states such as an engine rotational speed, a speed change state. The working system detection sensor group 82 includes sensors for detecting a position or a tilting of the implement 30, a sensor for detecting work load, etc. The autonomous/manual switching operation tool 83 is a switch for selecting either an autonomous traveling mode for traveling by autonomous steering and a manual steering mode for traveling by the manual steering. For instance, if the autonomous/manual switching operation tool 83 is operated during traveling in the autonomous steering mode, switchover is made to traveling by the manual steering. Conversely, if the autonomous/manual switching operation tool 83 is operated during traveling in the manual steering mode, switchover is made to traveling by the autonomous steering.

The control unit 5 includes a traveling route calculation module 60 which is a functional section described above with reference to FIG. 1 and FIG. 2. This traveling route calculation module 60 includes a work traveling route calculation section 61, a fore traveling route calculation section 62 and a post traveling route calculation section 63; and is constituted substantially of a program. In this embodiment, the field information required for calculation of each traveling route in the traveling route calculation module 60 will be retrieved from a field information storage section 101 of the management computer 100 installed at the remote management center KS and downloaded to the control unit 5. Such downloaded field information will be stored in the field information storage section 55 of the control unit 5. Similarly, a work plan describing a traveling work in a designated field will be downloaded from a work plan management section 102 of the management computer 100 and downloaded to the control unit 5. Then, the tractor and the implement 30 will be adjusted to allow the traveling work to be carried out, based on the work plan, and traveling system specification data and working system specification data which constitute the field work vehicle information needed for the traveling route calculation are stored in the control unit 5.

In addition to the above, the control unit 5 includes a traveling control section 50, a work control section 54, a self vehicle position calculation section 53 and an informing section 56. The self vehicle position calculation section 53 calculates a self vehicle position based on the positioning data transmitted from the GPS module 80. As this tractor is configured to be capable of both the autonomous traveling (autonomous steering) and the manual traveling (manual steering), the traveling control section 50 for controlling the vehicle traveling device group 71 includes both a manual traveling control section 51 and an autonomous traveling control section 52. The manual traveling control section 51 controls the vehicle traveling device group 71 based on the operation of the driver. When the vehicle travels autonomously along a traveling route calculated and finally determined by the traveling route calculation module 60, the autonomous traveling control section 52 calculates a directional deviation and a positional deviation between such traveling route and the self vehicle position, and generates an autonomous steering command and outputs this command to the steering motor 14 via the output processing section 7. The work controlling section 54 provides the implement device group 72 with control signals for controlling actions/motions of the implement 30. The informing section 56 generates informing signals (display data or voice data) for informing necessary information to the driver or the supervising person via the informing device 73 such as a display. In the instant embodiment, the informing section 56 has a display data generation function and generates display data for displaying the fore traveling route, the post traveling route and the work traveling route on a display. Depending on necessity, the informing section 56 can selectively display any one/some/all of the fore traveling route, the post traveling route and the work traveling route on the display.

Figure 5:
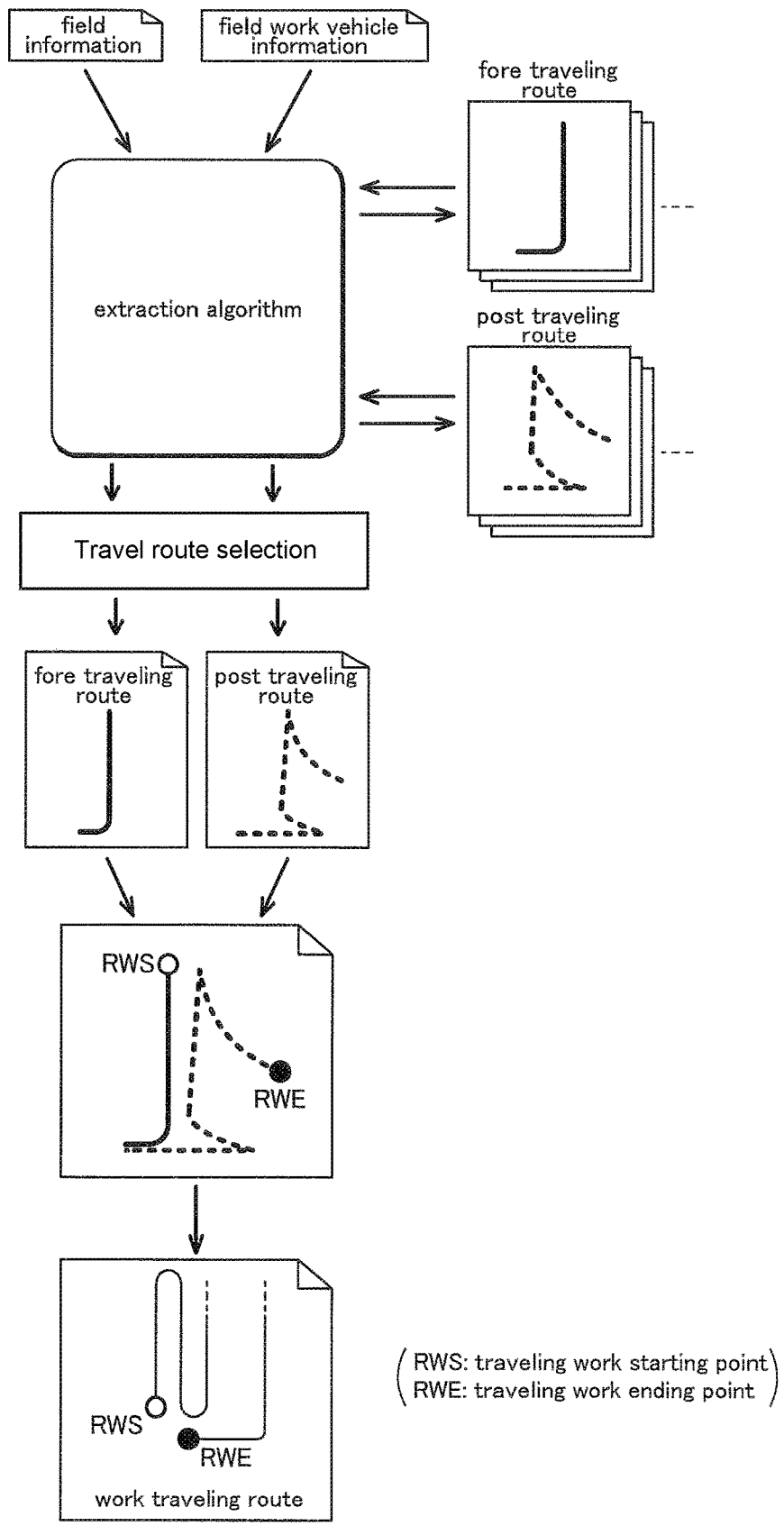
FIG. 5 is a schematic diagram for describing one example of traveling route production.

In the description as shown in FIG. 2, the traveling route calculation module 60 determines the traveling work starting point and the traveling work ending point from the field information including the entrance/exit area information and from the field work vehicle information; and calculates the fore traveling route, the work traveling route and the post traveling route based thereon. On the other hand, the calculations of the respective traveling routes at the traveling route calculation module 60 are not limited to the above method. For instance, as shown in FIG. 5, it is possible to calculate the fore traveling route and the post traveling route firstly, and then calculate the work traveling route based on the traveling work starting point and the traveling work ending point obtained thereby. In the case of the example as shown in FIG. 5, from various patterns of the fore traveling routes and the post traveling routes stored in advance, some candidates for the fore traveling route and the post traveling route will be extracted based on the field information including the entrance/exit area information and on the field work vehicle information. As an algorithm for such extraction, a machine learning algorithm such as a pattern recognition processing can be employed for instance. Further, from the extracted fore traveling routes and post traveling routes, respective optimal ones will be selected. This selection can be done by the driver or the supervising person, or can be done automatically with consideration to past performance (which may include a performance in a similar field). Then, a work traveling route will be calculated with using the traveling work starting point and the traveling work ending point specified by the selected optimal fore and post traveling routes.

Other Embodiments (1) In the foregoing embodiment, as a work vehicle, there was cited a tractor mounting a rotary cultivator as the utility implement 30. However, aside from such tractor, the work vehicle can be embodied as other various kinds of work vehicles such as an agricultural vehicle including a rice planter, a fertilizer and a combine, each for another embodiment.

(2) The respective functional sections in the functional block diagram as shown in FIG. 4 are sectioned mainly for the sake of explanation. In actuality, however, the respective functional sections can be combined or can be further divided in sub sections, if necessary. For instance, the traveling route calculation module 60 may be built in the management computer 100 and calculated respective traveling routes will be downloaded to the control unit 5 of the field work vehicle. Further, in place of the management computer 100 installed in the remote management center KS, it is possible to employ a communication terminal device (a mobile phone, a tablet computer, etc.) carried by the driver or the supervising person. Needless to say, all of the functional sections of this field traveling route production system can be built in the field work vehicle.

INDUSTRIAL APPLICABILITY

The present invention is applicable to a field work vehicle configured to carry out a traveling work in a field along a set traveling route and also to a system for producing such traveling route. Traveling along the traveling route can be manual traveling or autonomous traveling.

DESCRIPTION OF REFERENCE MARKS/NUMERALS

1: vehicle body
5: control unit
7: output processing section
8: input processing section
11: front wheels
12: rear wheels
13: steering mechanism
14: steering motor
20: maneuvering section
21: cabin
22: steering wheel
30: utility implement
31: lifting mechanism
50: traveling control section
51: manual traveling control section
52: autonomous traveling control section
53: self vehicle position calculation section
54: work control section
55: field information storage section
56: informing section
60: traveling route calculation module
61: work traveling route calculation section
62: fore traveling route calculation section
63: post traveling route calculation section
70: communication processing section
71: vehicle traveling device group
72: implement device group
73: informing device
80: global positioning system module (GPS module)
81: traveling system detection sensor group
82: working system detection sensor group
83: autonomous/manual switching operation tool
100: management computer
101: field information storage section
102: work plan management section
KS: management center

What is claimed is:

1. A field traveling route production system configured to produce a traveling route for a field work vehicle, the system comprising:
   a field information storage section that stores field information including position information of a field and position information of an entrance/exit area of the field including an area outside the field;
   a work traveling route calculation section that calculates a work traveling route for the field work vehicle based on the field information and specification of the field work vehicle, the work traveling route interconnecting a traveling work starting point located inside the field and a traveling work ending point located inside the field;
   a fore traveling route calculation section that calculates a fore traveling route extending from the area outside the field to the traveling work starting point of the work traveling route through the entrance/exit area; and
   a post traveling route calculation section that calculates a post traveling route extending from the traveling work ending point to the area outside the field through the entrance/exit area.

2. A field work vehicle incorporating the field traveling route production system as defined in claim 1.

3. The field traveling route production system as defined in claim 1, wherein:
   the field information includes traveling surface slope information of the entrance/exit area; and
   the traveling surface slope information is utilized when the fore traveling route and the post traveling route are calculated.

4. The field traveling route production system as defined in claim 3, further comprising:
   an informing section having a display data generation function for displaying the work traveling route, the fore traveling route and the post traveling route on a display.

5. A field work vehicle configured to perform a traveling work along a traveling route that is generated by the field traveling route production system as defined in claim 3, wherein:

the field work vehicle comprises a display for displaying the work traveling route, the fore traveling route and the post traveling route.

6. A field work vehicle incorporating the field traveling route production system as defined in claim 3.

7. The field traveling route production system as defined in claim 3, wherein:
based on the traveling surface slope information and the specification of the field work vehicle, a posture and/or an orientation of the field work vehicle are/is determined for the fore traveling route and the post traveling route.

8. The field traveling route production system as defined in claim 7, further comprising:
an informing section having a display data generation function for displaying the work traveling route, the fore traveling route and the post traveling route on a display.

9. A field work vehicle configured to perform a traveling work along a traveling route that is generated by the field traveling route production system as defined in claim 7, wherein:
the field work vehicle comprises a display for displaying the work traveling route, the fore traveling route and the post traveling route.

10. A field work vehicle incorporating the field traveling route production system as defined in claim 7.

11. The field traveling route production system as defined in claim 1, further comprising:
an informing section having a display data generation function for displaying the work traveling route, the fore traveling route and the post traveling route on a display.

12. A field work vehicle incorporating the field traveling route production system as defined in claim 11.

13. A field work vehicle configured to perform a traveling work along a traveling route that is generated by the field traveling route production system as defined in claim 1, wherein:
the field work vehicle comprises a display for displaying the work traveling route, the fore traveling route and the post traveling route.

14. The field work vehicle as defined in claim 13, wherein:
the field work vehicle comprises an autonomous traveling control section configured for autonomous traveling on the work traveling route, the fore traveling route and the post traveling route.

* * * * *